United States Patent [19]
Ahonen et al.

[11] Patent Number: 4,985,081
[45] Date of Patent: Jan. 15, 1991

[54] METHOD OF PRODUCING CEMENT OR CONCRETE

[75] Inventors: Heikki Ahonen, Valkeakoski; Timo Kenakkala, Tampere; Pertti Kokkonen, Kempele, all of Finland

[73] Assignee: Oy Iampella Ab, Tampere, Finland

[21] Appl. No.: 486,403

[22] Filed: Feb. 28, 1990

[30] Foreign Application Priority Data

Mar. 17, 1989 [FI] Finland ................................. 891284

[51] Int. Cl.$^5$ .............................................. C04B 11/00
[52] U.S. Cl. .................................. 106/772; 106/765; 106/791; 106/792; 423/171; 423/555
[58] Field of Search ............... 106/100, 102, 103, 109, 106/117, 118, 87, 748, 765, 772, 789, 791, 792; 264/46.4; 423/171, 555

[56] References Cited

U.S. PATENT DOCUMENTS 4,495,162 1/1985 Jons et al. ........................... 106/117
4,544,542 10/1985 Angevine et al. .................. 106/109

FOREIGN PATENT DOCUMENTS 53-53113 5/1978 Japan .

OTHER PUBLICATIONS

*Ceramic Bulletin,* vol. 59, No. 8 (1980), "Effect of Lime on the Hydration of Supersulfated Slag Cement", Kondo et al., pp. 848–851.
*Silicates Industriels,* 1982-2, "Supersulfated Cement: Improved Properties", Bijen et al., pp. 45–53.
*Silicates Industriels,* 1982-7/8, "Characterization of Supersulphate Cement Hardened under Various Curing", Tashiro et al., pp. 173–181.
Abstract 92:115345h "Hydration of Supersulfated Slag Cement", 58—Cement and Concrete Products, vol. 92, 1980.
*The Chemistry of Cements,* vol. 2, 1964, Chapter 15, "Expanding and Stressing Cements", P. E. Halstead.
Dialog Abstracts—JP 76126163 (no date provided) Fujikk.

*Primary Examiner*—William R. Dixon, Jr.
*Assistant Examiner*—Paul Marcantoni

[57] ABSTRACT

A method of producing cement or concrete, comprising the step of adding fly ash to the cement or concrete at the production stage, the fly ash containing lime and reaction products from the reaction occurring between lime and sulphur oxides in connection with the desulphuration of flue gases. To avoid the disadvantageous effects of calcium sulphite and entringite reactions and to increase the used amount of fly ash containing desulphuration waste, the calcium sulphite is oxidized by hydrogen peroxide either before the production of cement or concrete or during the production.

20 Claims, No Drawings

METHOD OF PRODUCING CEMENT OR CONCRETE

The invention relates to a method of producing cement or concrete, comprising the step of adding fly ash to the cement or concrete at the production stage, the fly ash containing lime and reaction products from the reaction occurring between lime and sulphur oxides in connection with the desulphuration of flue gases.

Fly ash formed as a fuel combustion product in power plants is used widely as an additive and auxiliary agent in the production of cement and in the production of concrete made of such cements. Being a waste material, fly ash has a low price, in addition to which it has advantageous pozzolan properties, that is, it hardens hydraulically in the presence of lime. Ordinary fly ash is added to cement in an amount of about 20 to 25%, and on preparing concrete from the cement, a small additional amount of fly ash is added.

With increased emphasis on the protection of air, the desulphuration of flue gases in power plants has become increasingly important. In most desulphuration processes sulphur is bound by lime with resultant formation of gypsum and calcium sulphite as a reaction product of sulphur oxides, lime and oxygen. One common desulphuration technique is to inject lime or limestone directly into the furnace of a power plant boiler, so that gypsum is formed at high temperatures exceeding 800° C. The reaction results in a desulphuration product which does not only contain ordinary fly ash but also gypsum formed as a reaction product of lime and sulphur oxides in the furnace and outside it at a still high temperature and calcium sulphite formed subsequently at a lower temperature. When utilizing this mixture, calcium sulphite is disadvantageous for many reasons. It has turned out that particularly in the production of cement or concrete the mixture causes deformations and swelling, as a result of which the long-term strength properties are deteriorated or their formation is totally prevented. The use of the above-mentioned desulphurating product has proved to have unfavourable effect on the early strength properties at the initial stage of concrete products as compared with the use of ordinary fly ash in the production of concrete products.

It is stated in an article Effect of Lime on the hydration of supersulphated slag cement (Ceramic Bulletin, p. 848, Vol. 59, No. 8/1980) that an optimum amount of activating lime in the production of supersulphated cement is about 0.3%, and that with an amount of lime as low as 2% the hydration of slag already drops to a value less than half of the hydration achieved with an amount of lime of 0.3%.

An article Supersulphated cement: Improved properties (Silicates Industries 1982-2 p. 50) states that when clinker is used for activating supersulphated cement, it is typically used in an amount of 1 to 2% to prevent excessive formation of calcium hydroxide in the product. In the hydration lime is liberated from typical clinker about 25 to 30% on the weight of clinker, so that the final product contains lime less than 0.6% on the weight of the product. It is emphasized in the article that an increase in the amount of clinker above 2% deteriorates the strength properties.

It is further stated in an article Characterization of supersulphate cement hardened under various curing (Silicates Industries 1982-7/8, page 174) that increase in the amount of activating lime causes a rapid deterioration of strength properties. It is further stated in the article that the amount of activating lime increases pore volume, thus deteriorating the chemical strength of the matrix.

Also, it is stated in an article Hydration of supersulphated slag cement (57 Ceramics, Vol. 92, 1980) that when activating lime is used in amounts below and above 0.3%, very poor results are obtained in supersulphated cement products.

Finally, an article by Taylor (The chemistry of cements, Vol. 2 chapter 15) states that the aluminates and gypsum present in pozzolans easily result in the formation of entringite. Being an uncontrollably swelling and unstable substance, entringite spoils concrete rapidly.

As is widely known and as appears from the above articles, a desulphuration product formed in a normal way cannot as such be used in any great quantities in the production of cement and concrete because of the drawbacks caused by it, such as the deterioration of strength and other kind of structural deterioration and breaking.

In an attempt to oxidize calcium sulphite, a fluidized-bed furnace has been used in which a pure desulphuration product free from fly ash is subjected to oxidation at a high temperature. This, however, is complicated and difficult and requires that the fly ash should be separated from the flue gases before desulphuration in addition to which the oxidation equipment is expensive. In principle, calcium sulphite is oxidized by itself on exposure to air, but this takes a long time and with large amounts of waste it is not possible to expose all the material particles to air, so the solution does not work economically and technically.

The object of the present invention is to provide a method of producing cement or concrete in which the above-mentioned drawbacks are avoided and which produces fly ash containing reaction products from a desulphuration process, which fly ash can be used abundantly and economically in the production of cement or concrete and concrete products without substantially deteriorating the strength of the cement or concrete so obtained. This is achieved according to the invention in such a manner that the calcium sulphite obtained as a reaction product is oxidized into calcium sulphate by exposing it to hydrogen peroxide.

It is essential in the invention that the calcium sulphite formed or to be formed in the desulphuration process is oxidized by hydrogen oxide when it is used in the production of cement or concrete, either in connection with the desulphuration process or at the concrete production stage. It is particularly advantageous to carry out the oxidation by a so-called Lifac desulphuration technique, in which limestone powder is injected into the furnace of the boiler and activated after the furnace of the boiler in a separate activation reactor by spraying water into the flue gases. Hydrogen peroxide can thereby be introduced, for instance, by mixing it with the spraying water of the activation reactor or alternatively with the concrete mix water when the desulphuration-waste-containing fly ash formed in said reactor is to be used as an ingredient in the production of concrete. An advantage of the method of the invention is that the oxidation of the desulphuration waste can be carried out by a simple and inexpensive equipment with a simple technique, obtaining very usable and economically advantageous raw material for the production of concrete or cement.

The method of the invention was tested by adding hydrogen peroxide to the concrete mix water. Control tests without the hydrogen peroxide oxidation were carried out at the same time with the same ash, and correspondingly with the same ash which did not contain any lime, gypsum or calcium sulphite, that is, no desulphuration method had been applied. It was to be expected that the oxidized desulphuration ash would have given nearly the same strength to the concrete as ordinary ash conventionally used for the purpose. Contrary to expectations, it was found that the ash oxidized with peroxide gave much better results than conventionally used fly ash containing no lime.

The invention will be described in greater detail by means of the following examples, in which tests were carried out by adding hydrogen peroxide to the mix water in an amount of 30% and 60% in excess of the equivalent amount corresponding to the oxidation reaction of calcium sulphite contained in the fly ash.

EXAMPLE 1

Concrete surfacing slabs were produced by automatic machines with the following receipts:

| kg/m³ amounts: | Normal | L1 | L2 | L3 | L4 | L5 |
|---|---|---|---|---|---|---|
| OPC cement | 330 | 330 | 240 | 330 | 330 | 240 |
| Fly ash | 60 | | | | | |
| Lifac ash | | 60 | 150 | | | |
| Lifac ash +peroxide | | | | 60 | 60 | 150 |
| Filler 0–1 mm | 160 | 160 | 160 | 160 | 160 | 160 |
| Sand 0–4 mm | 1260 | 1260 | 1260 | 1260 | 1260 | 1260 |
| Breakstone 3–6 mm | 360 | 360 | 360 | 360 | 360 | 360 |
| Water | 82 | 86 | 95 | 86 | 86 | 95 |

Increase in the amount of water when using ash containing desulphuration product is due to the fact that the gypsum contained in this kind of ash binds water rapidly. All the tests aimed at achieving a similar earthmoist concrete mass which remained cohesive during compression.

The strengths obtained appear from the following Table 1, which gives the strengths as bending strengths under tension (MPa) as the mere compression strength was not interesting in this product:

TABLE 1

| | Bending strength under tension after the test pieces had hardened at 15° C. for | | | |
|---|---|---|---|---|
| | 2 days | 7 days | 28 days | 90 days/MPa |
| Normal | 3.0 | 3.5 | 6.5 | 7.0 |
| L1 | 3.0 | 3.5 | 5.5 | 5.4 |
| L2 | 2.5 | 3.2 | 3.9 | 3.6 |
| L3 | 5.2 | 6.5 | 7.8 | 8.2 |
| L4* | 5.5* | 6.2* | 6.8* | 7.2* |
| L5 | 4.0 | 4.9 | 5.8 | 6.5 |

The asterisked product contained $H_2O_2$ in an excess of 60% equivalent amount, which decreased the density due to the micro bubbles formed during the decomposition of peroxide.

It appears from the results that the desulphuration waste containing concrete prepared according to the receipt L3 had clearly better strength values than the other concretes. Correspondingly, the concrete prepared according to the receipt L4, containing desulphuration waste and hydrogen peroxide in an excess of 60% on the equivalent amount of calcium sulphite, had better strength values than concrete prepared conventionally with the addition of pure fly ash. Accordingly, the concrete prepared according to the invention by the addition of fly ash containing desulphuration waste had equal or better strength values than previously used concretes and was prepared economically. This was found to take place substantially similarly when hydrogen peroxide was used in an amount 1.5 to 2 times in excess of the equivalent amount of the calcium sulphite contained in the mixture.

Lifac ash was tested for its applicability as an ingredient in the production of supersulphated cement Supersulphated cements generally contain:

powdered iron slag 90%
  anhydrous gypsum 10%
  activating lime 0.3–0.4%

As mentioned above, the tests and experience show that the strength values decrease rapidly with increasing amount of lime when the concrete is produced with the prior art technique. In place of lime the activation can be carried out by cement, the amount of cement being about 3 to 5%. The mixture resulting from the desulphuration process contains free lime typically in an amount as high as 20%, depending on the running conditions and the degree of desulphuration. On the basis of the above-mentioned values it would thereby be possible to add only 5 to 20% of said ash to supersulphated cement without notably deteriorating the strength values. In the test, supersulphated cement was prepared in which the calcium sulphite contained in the ash which has been obtained as a desulphuration product was oxidized by means of peroxide.

EXAMPLE 2

Supersulphated cement SSC was prepared with the following mix ratios, the mixes were compressed into blocks in a concrete block machine, and the blocks were tested for their bending strength under tension.

| Amounts kg/m3 | SSC I | SSC II | SC |
|---|---|---|---|
| Slag 450 m²/kg | 260 | 200 | 234 |
| Lifac ash | 130 | 60 | — |
| Cement | — | 130 | 156 |
| Filler 0–1.0 mm | 160 | 160 | 160 |
| Sand 0–4.0 mm | 1260 | 1260 | 1260 |
| Breakstone 3–6 mm | 360 | 360 | 360 |
| Hydr. peroxide 30% | 1.5 | 0.75 | — |

A water amount of about 90 to 95 l was used in all the mixes, thus subjecting them to similar earthmoist conditions.

TABLE 2

| | Bending strength under tension (MPa) after the blocks had dried at 15° C. for | | | |
|---|---|---|---|---|
| | 2 days | 7 days | 28 days | 90 days |
| SSC I | 1.3 | 3.8 | 5.4 | 6.4 |
| SSC II | 4.3 | 7.1 | 7.7 | 8.1 |
| SC | 3.8 | 5.8 | 6.7 | 7.2 |

It appears from the test results that the Lifac ash containing supersulphated cement prepared according to the receipt SSC II had considerably better strength values than the conventional slag cement prepared according to the receipt SC. It further appears that a great amount of free lime did not hamper the development of strength. Surprisingly enough, the results are contradictory to results reported in the literature because no sensitivity with respect to the amount of lime was observed but the amount of Lifac ash oxidized with peroxide was not particularly critical.

As mentioned above, the use of the fly ash obtained by the Lifac method is particularly advantageous when applying the method of the invention. When using the Lifac method, the calcium oxide particles formed in the furnace of the boiler are first covered with a layer of gypsum and then with a layer of calcium sulphite so that three-layer particles are obtained. This is illustrated in the attached figure, which is a schematic cross-sectional view of a particle obtained by the Lifac method as seen by an electron microscope. The particle of the figure comprises calcium oxide 1 in the middle, and the calcium oxide is covered with a layer of gypsum 2 formed mainly in the furnace of the boiler. A calcium sulphite layer 3 has been formed on the gypsum layer at a later stage in connection with activation with water. In the present method, the calcium sulphite layer 3 is oxidized into gypsum by means of hydrogen peroxide. The method of the invention can be particularly advantageously applied by using fly ash containing particles formed in this way because after the peroxide oxidation the particles comprise two superimposed layers of gypsum formed at different stages. These gypsum layers are very tight and hardly permeable to calcium hydroxide.

The entringite reaction, forming a phase which can be described by the formula

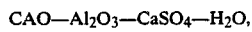

$$CAO-Al_2O_3-CaSO_4-H_2O,$$

requires that both sulphate and free lime are simultaneously available in the presence of aluminates. As the lime contained in the desulphuration ash formed as described above is encapsulated under a layer of gypsum after the oxidation step, this free lime has a retarded effect on the reactions so that no abrupt formation of entringite and resultant breaking of formed crystal bonds by the swelling entringite will take place. The retarded liberation of lime will later be compensated for in the normal pozzolan reactions, and its concentration will never rise to any dangerous values. In this way the disadvantageous effect of entringite reactions occurring in fly ash obtained by the Lifac method can be prevented especially effectively, so that it is preferable that the material is not ground.

Results corresponding to those obtained in the above examples were obtained when hydrogen peroxide was mixed with the mix water of a Lifac reactor in an amount 0.5 to 4 times in excess of the equivalent amount of calcium sulphite normally formed in the reaction, whereby the oxidation and the encapsulation of lime particles were effected in the same manner. Within the above-mentioned ranges of equivalent amounts of hydrogen peroxide, the strength values obtained were substantially equal to or better than those of a conventional cement or concrete containing pure fly ash. Outside this range, however, a fairly rapid drop in the strength values was observed.

The invention has been described above by way of example, and the invention is by no means restricted to this example. According to the invention, the peroxide oxidation can be applied to all kinds of fly ash containing the reaction products of lime and sulphur in the preparation of cement and concrete. Similarly, the hydrogen peroxide can be sprayed into the flue gases either with the spraying water or separately.

We claim:

1. A method of producing cement or concrete, utilizing fly ash containing calcium sulphite and reaction products from the reaction occurring between lime and sulphur oxides in connection with the desulphurization of flue gases, and utilizing hydrogen peroxide, comprising the steps of:
   (a) at the cement or concrete production stage, adding the fly ash containing calcium sulphite and reaction products to the cement or concrete; and
   (b) adding hydrogen peroxide so as to effect oxidation of the calcium sulphite into calcium sulphate;
   the amount of fly ash containing calcium sulphite and reaction products, and hydrogen peroxide, added being an effective amount of each to obtain strength values of the concrete or cement produced substantially equal to or better than those of conventional cement or concrete containing pure fly ash.

2. A method as recited in claim 1 wherein step (a) is practiced by utilizing as the fly ash a reaction product formed by injecting lime into the furnace of a boiler, the reaction product containing lime particles covered with a layer of calcium sulphate on which later calcium sulphite is formed subsequently, and oxidizing to calcium sulphate by the hydrogen peroxide addition in step (b).

3. A method as recited in claim 2 wherein step (b) is practiced by adding hydrogen peroxide to the concrete or cement at the concrete or cement production stage.

4. A method as recited in claim 1 wherein step (b) is practiced by adding hydrogen peroxide to the concrete or cement at the concrete or cement production stage.

5. A method as recited in claim 1 wherein the effective amount of hydrogen peroxide is an amount 0.5-2 times in excess of the equivalent amount of calcium sulphite to be oxidized.

6. A method as recited in claim 3 wherein the effective amount of hydrogen peroxide is in an amount 0.5-2 times in excess of the equivalent amount of calcium sulphite to be oxidized.

7. A method as recited in claim 4 wherein the effective amount of hydrogen peroxide is in an amount 0.5-2 times in excess of the equivalent amount of calcium sulphite to be oxidized.

8. A method as recited in claim 1 wherein step (b) is practiced by injecting lime into a furnace of a boiler during the desulphurization of flue gases and then, at a temperature substantially lower than the temperature of the furnace, spraying hydrogen peroxide into the flue gases to oxidize the calcium sulphite in the fly ash contained in the flue gases.

9. A method as recited in claim 2 wherein step (b) is practiced by injecting lime into a furnace of a boiler during the desulphurization of flue gases and then, at a temperature substantially lower than the temperature of the furnace, spraying hydrogen peroxide into the flue gases to oxidize the calcium sulphite in the fly ash contained in the flue gases.

10. A method as recited in claim 8 wherein step (b) is further practiced by mixing the hydrogen peroxide with water prior to spraying into the flue gases.

11. A method as recited in claim 10 wherein the effective amount of hydrogen peroxide to be sprayed into the flue gases is an amount 0.5-4 times in excess of the equivalent amount of the calcium sulphite to be oxidized.

12. A method as recited in claim 8 wherein the effective amount of hydrogen peroxide to be sprayed in to the flue gases is an amount of 0.5-4 times in excess of the equivalent amount of the calcium sulphite to be oxidized.

13. A method as recited in claim 1 wherein step (a) is practiced by combining iron slag with said fly ash to produce concrete, and wherein the amount of fly ash utilized is not more than 50% of the amount of iron slag.

14. A method as recited in claim 8 wherein step (a) is practiced by producing concrete using cement and said fly ash, and wherein the amount of fly ash added is no more than 65% of the amount of cement.

15. A method as recited in claim 2 wherein step (a) is practiced by combining iron slag with said fly ash to produce concrete, and wherein the amount of fly ash utilized is no more than 50% of the amount of iron slag.

16. A method as recited in claim 5 wherein step (a) is practiced by combining iron slag with said fly ash to produce concrete, and wherein the amount of fly ash utilized is no more than 50% of the amount of iron slag.

17. A method as recited in claim 8 wherein step (a) is practiced by combining iron slag with said fly ash to produce concrete, and wherein the amount of fly ash utilized is no more than 50% of the amount of iron slag.

18. A method as recited in claim 5 wherein step (a) is practiced by producing concrete using cement and said fly ash, and wherein the amount of fly ash added is no more than 65% of the amount of cement.

19. A method as recited in claim 8 wherein step (a) is practiced by producing concrete using cement and said fly ash, and wherein the amount of fly ash added is no more than 65% of the amount of cement.

20. A method as recited in claim 1 wherein step (a) is practiced by adding fly ash particles containing desulphurization waste directly from a desulphurization process, without grinding or otherwise reducing the size of the fly ash particles.

* * * * *

UNITED STATES PATENT AND TRADEMARK OFFICE
CERTIFICATE OF CORRECTION

PATENT NO. : 4,985,081

DATED : Jan. 15, 1991

INVENTOR(S) : Ahonen et al

It is certified that error appears in the above-identified patent and that said Letters Patent is hereby corrected as shown below:

On the title page, item [73] Assignee: "Oy Iampella Ab" should be

-- Oy Tampella Ab --

Signed and Sealed this

Twenty-eighth Day of July, 1992

*Attest:*

DOUGLAS B. COMER

*Attesting Officer*   *Acting Commissioner of Patents and Trademarks*